United States Patent
Kondo

(10) Patent No.: US 11,094,241 B2
(45) Date of Patent: Aug. 17, 2021

(54) DISPLAY DRIVER, ELECTRO-OPTICAL DEVICE, ELECTRONIC APPARATUS, AND MOBILE BODY

(71) Applicant: Seiko Epson Corporation, Tokyo (JP)

(72) Inventor: Daishi Kondo, Chino (JP)

(73) Assignee: Seiko Epson Corporation

( * ) Notice: Subject to any disclaimer, the term of this patent is extended or adjusted under 35 U.S.C. 154(b) by 0 days.

(21) Appl. No.: 16/919,183

(22) Filed: Jul. 2, 2020

(65) Prior Publication Data

US 2021/0005129 A1 Jan. 7, 2021

(30) Foreign Application Priority Data

Jul. 5, 2019 (JP) .............................. JP2019-125792

(51) Int. Cl.
*G09G 5/00* (2006.01)
*G09G 3/20* (2006.01)
*G02F 1/137* (2006.01)

(52) U.S. Cl.
CPC ........... *G09G 3/2007* (2013.01); *G02F 1/137* (2013.01); *G09G 2290/00* (2013.01)

(58) Field of Classification Search
CPC .. G09G 3/20; G09G 5/00; G02F 1/137; G06F 3/038
See application file for complete search history.

(56) References Cited

U.S. PATENT DOCUMENTS

| | | | |
|---|---|---|---|
| 2006/0197729 | A1 | 9/2006 | Shiraishi et al. |
| 2007/0126664 | A1* | 6/2007 | Kimura ............. H01L 29/78669 345/76 |
| 2008/0278423 | A1* | 11/2008 | Cheng .................. G09G 3/3622 345/88 |
| 2012/0207205 | A1* | 8/2012 | Zhao ...................... H05B 45/46 375/238 |
| 2017/0103715 | A1* | 4/2017 | Oyama ............. G02F 1/133504 |
| 2019/0230760 | A1* | 7/2019 | Li .......................... H05B 45/20 |
| 2020/0380909 | A1* | 12/2020 | Matoba ................ G09G 3/2003 |

FOREIGN PATENT DOCUMENTS

| | | |
|---|---|---|
| JP | 2006-243560 A | 9/2006 |
| JP | 2013-057905 A | 3/2013 |
| JP | 2019-045766 A | 3/2019 |
| WO | 2019-049670 A1 | 3/2019 |

* cited by examiner

*Primary Examiner* — Pegeman Karimi
(74) *Attorney, Agent, or Firm* — Harness, Dickey & Pierce, P.L.C.

(57) ABSTRACT

A display driver (100) includes terminals (TSEG1 and TSEG2) and a drive circuit (130). The terminal (TSEG1) can be connected to a segment electrode (ESEG1). The terminal (TSEG2) can be connected to a segment electrode (ESEG2) whose area is larger than the area of the segment electrode (ESEG1). The drive circuit (130) outputs a PWM segment drive signal (SSEG1) to the terminal (ESEG1), and outputs a PWM segment drive signal (SSEG2) to the terminal (TSEG2). When the same effective voltage is applied to the segment electrode (ESEG1) and the segment electrode (ESEG2), the duty ratio of the segment drive signal (SSEG1) is smaller than the duty ratio of the segment drive signal (ESEG2).

13 Claims, 12 Drawing Sheets

FIRST INSTRUCTION INFORMATION

| TONE VALUE | DUTY RATIO DATA |
|---|---|
| 0000 | D0 |
| 0001 | D10 |
| 0010 | D17 |
| 0011 | D25 |
| 0100 | D30 |
| 0101 | D32 |
| 0110 | D34 |
| 0111 | D36 |
| ... | ... |
| 1111 | D60 |

SECOND INSTRUCTION INFORMATION

| DUTY RATIO DATA |
|---|
| D74 | ature
DISPLAY DRIVER, ELECTRO-OPTICAL DEVICE, ELECTRONIC APPARATUS, AND MOBILE BODY The present application is based on, and claims priority from JP Application Serial Number 2019-125792, filed Jul. 5, 2019, the disclosure of which is hereby incorporated by reference herein in its entirety.

BACKGROUND

1. Technical Field

The present invention relates to a display driver, an electro-optical device, an electronic apparatus, a mobile body, and the like.

2. Related Art

A PWM tone method is known as a method of driving a liquid crystal panel. In this method, a display driver drives a liquid crystal panel by outputting a PWM drive signal having a duty ratio corresponding to tone data. A known technique of such a PWM tone method is disclosed in JP-A-2006-243560, for example.

When a display driver drives a liquid crystal panel, the capacitive load increases as the segment electrode of a cell to be driven increases. As the capacitive load increases, the effective voltage of a PWM drive signal decreases. Therefore, there is a problem in that, even if PWM drive signals having the same duty ratio are applied, the transmittance of liquid crystal changes in accordance with the areas of segment electrodes. For example, there is a risk that, in an icon or a liquid crystal shutter that has a very large area, a sufficient drive voltage cannot be obtained, and as a result, a display failure occurs or an insufficient ON state is entered. In a known technique in JP-A-2006-243560 or the like, the difference in capacitive load of a cell is not taken into consideration.

SUMMARY

One aspect of the disclosure relates to a display driver including: a first drive terminal that can be connected to a first segment electrode provided in an electro-optical panel that is driven by a static drive method; a second drive terminal that can be connected to a second segment electrode that is provided in the electro-optical panel and whose area is larger than the area of the first segment electrode; and a drive circuit configured to output a PWM first segment drive signal to the first drive terminal, and output a PWM second segment drive signal to the second drive terminal, wherein when the same effective voltage is applied to the first segment electrode and the second segment electrode, a first duty ratio, which is a duty ratio of the first segment drive signal is smaller than a second duty ratio, which is a duty ratio of the second segment drive signal.

BRIEF DESCRIPTION OF THE DRAWINGS

The disclosure will be described with reference to the accompanying drawings, wherein like numbers reference like elements.

DESCRIPTION OF EXEMPLARY EMBODIMENTS

Hereinafter, a preferable embodiment of the disclosure will be described in detail. Note that the embodiment given below is not intended to unduly limit the scope of the disclosure recited in the appended claims, and not all of the constituent elements described in the embodiment are essential to the disclosure.

1. Exemplary Configuration

Figure 1:
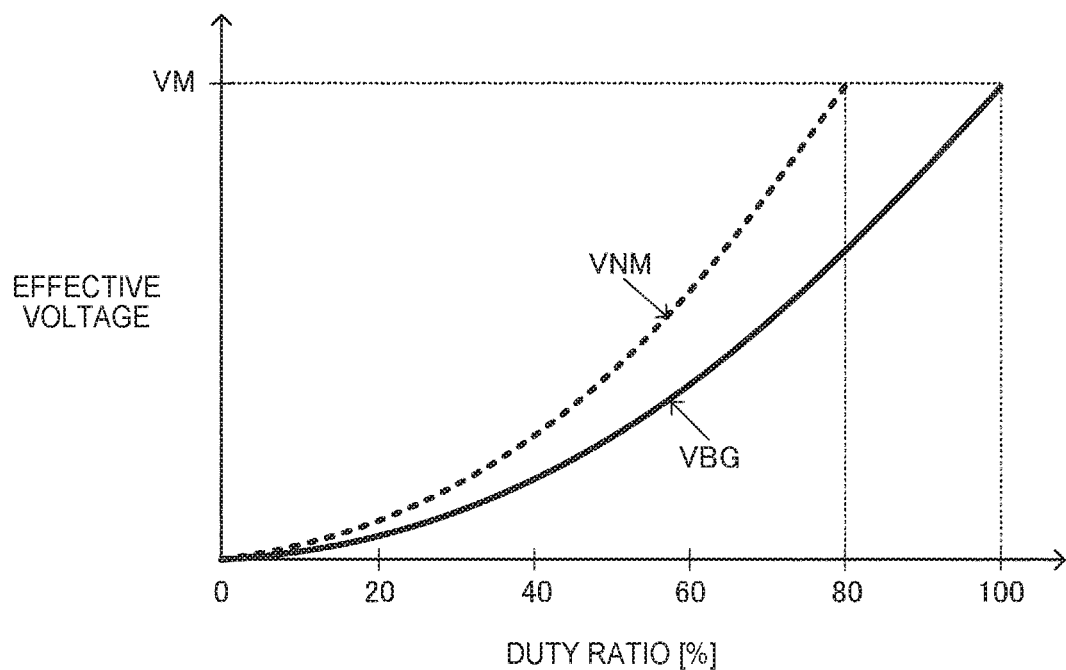
FIG. 1 shows exemplary characteristics of an effective voltage to be applied to liquid crystal with respect to a duty ratio of a drive signal.

FIG. 1 shows exemplary characteristics of an effective voltage to be applied to liquid crystal with respect to a duty ratio of a drive signal. The drive signal has a PWM (Pulse Width Modulation) waveform, and its voltage amplitude is the same between characteristics VNM and VBG. The characteristic VNM is a characteristic of an effective voltage to be applied to a first cell including a first segment electrode, and the characteristic VBG is a characteristic of an effective voltage to be applied to a second cell including a second segment electrode. The area of the second segment electrode is larger than the area of the first segment electrode.

As the size of the segment electrodes increase, the capacitive load seen from a drive circuit increases. Therefore, even if the drive circuit outputs drive signals having the same waveform to the first cell and the second cell, the drive signal that has arrived at the second cell has a waveform whose rising edge rises slower than that of the drive signal that has arrived at the first cell. Due to the difference in waveform, the effective voltage to be applied to the second cell is lower than the effective voltage to be applied to the first cell. As shown in FIG. 1, at the same duty ratio 80%, the effective voltage in the characteristic VBG is lower than the effective voltage in the characteristic VNM.

In PWM driving, tone display is realized by changing the duty ratio in accordance with a tone value. If the relationship between the tone value and the duty ratio is the same regardless of the area of the segment electrode, the effective voltage in the characteristic VBG is lower than the effective voltage in the characteristic VNM at each tone value. The transmittance of liquid crystal is determined by the effective voltage, and therefore the transmittance at each tone value changes in accordance with the area of the segment electrode. Therefore, there is a problem in that, even if the same tone is tried to be displayed, the actual display tone changes in accordance with the area of the segment electrode. For example, when the first cell and the second cell are icons, even if the same tone is tried to be displayed in the two icons, the brightness differs between the two icons.

Figure 11:
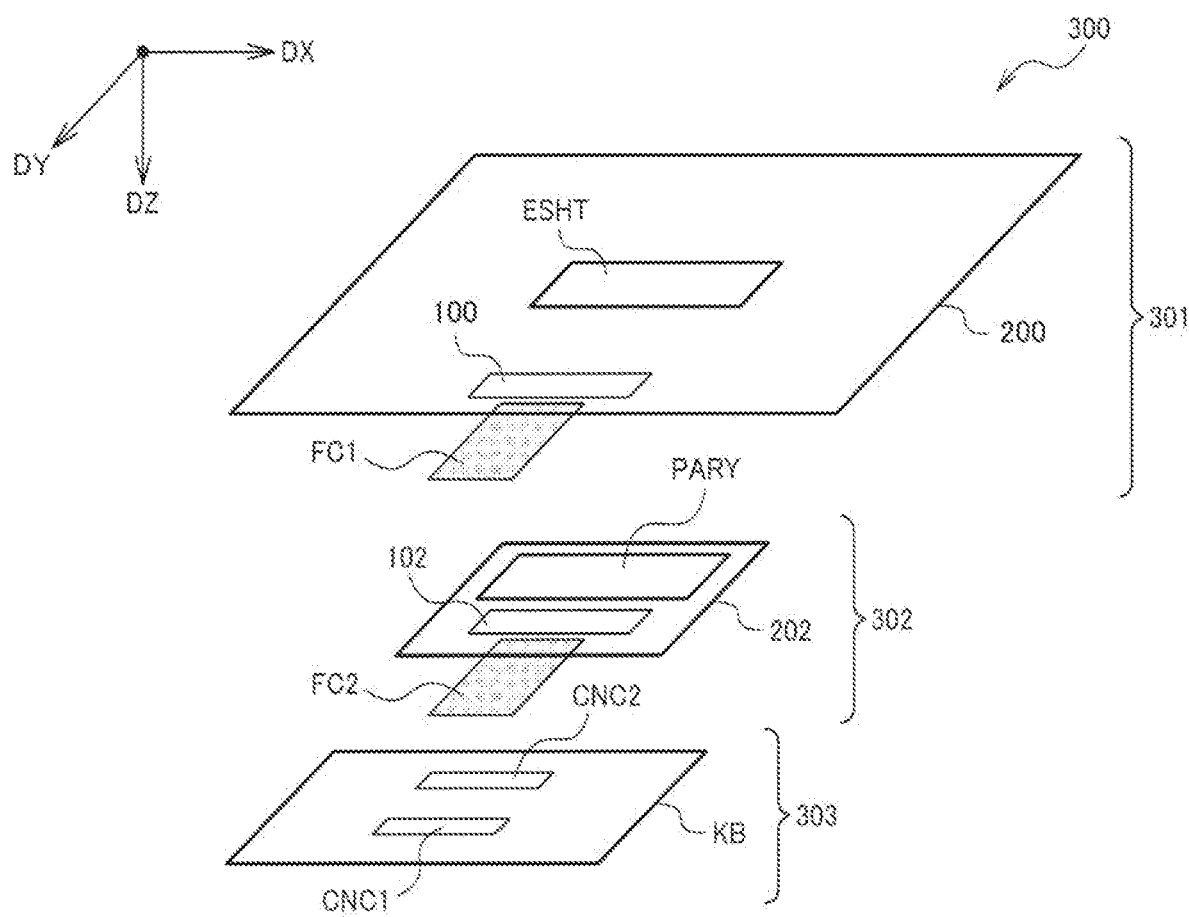
FIG. 11 shows a detailed exemplary configuration of an electro-optical device.

Alternatively, assuming that liquid crystal is turned on at a voltage VM, there is a problem in that the duty ratio at which the liquid crystal is turned on changes in accordance with the area of the segment electrode. For example, the voltage VM is a maximum value of an applied voltage defined in a specification of the liquid crystal. Here, if the maximum value of the duty ratio is set to 80% such that the voltage to be applied to the liquid crystal will not exceed the voltage VM, the second cell having the segment electrode whose area is large cannot be fully turned on. On the other hand, if the maximum value of the duty ratio is set to 100%, an overvoltage is applied to the first cell having the segment electrode whose area is small. For example, assume that, in an electro-optical panel in which an icon and a liquid crystal shutter are both present, the first cell is the icon and the second cell is the liquid crystal shutter, as shown in FIG. 11. If the maximum value of the duty ratio is set to 100% in order to turn on the liquid crystal shutter, an overvoltage is applied to the icon.

In order to solve such a problem, a method is conceivable in which the voltage amplitude of the PWM waveform is changed. That is, the voltage amplitude of a drive signal to be applied to the second cell having the segment electrode whose area is large is increased relative to the voltage amplitude of a drive signal to be applied to the first cell. With this, the effective voltage with respect to the same tone value can be the same between the first cell and the second cell. However, two power supply voltages corresponding to the two voltage amplitudes need to be supplied to the drive circuit, and therefore there is a problem in that a power supply circuit for generating the two power supply voltages is needed, and the circuit scale increases.

Figure 2:
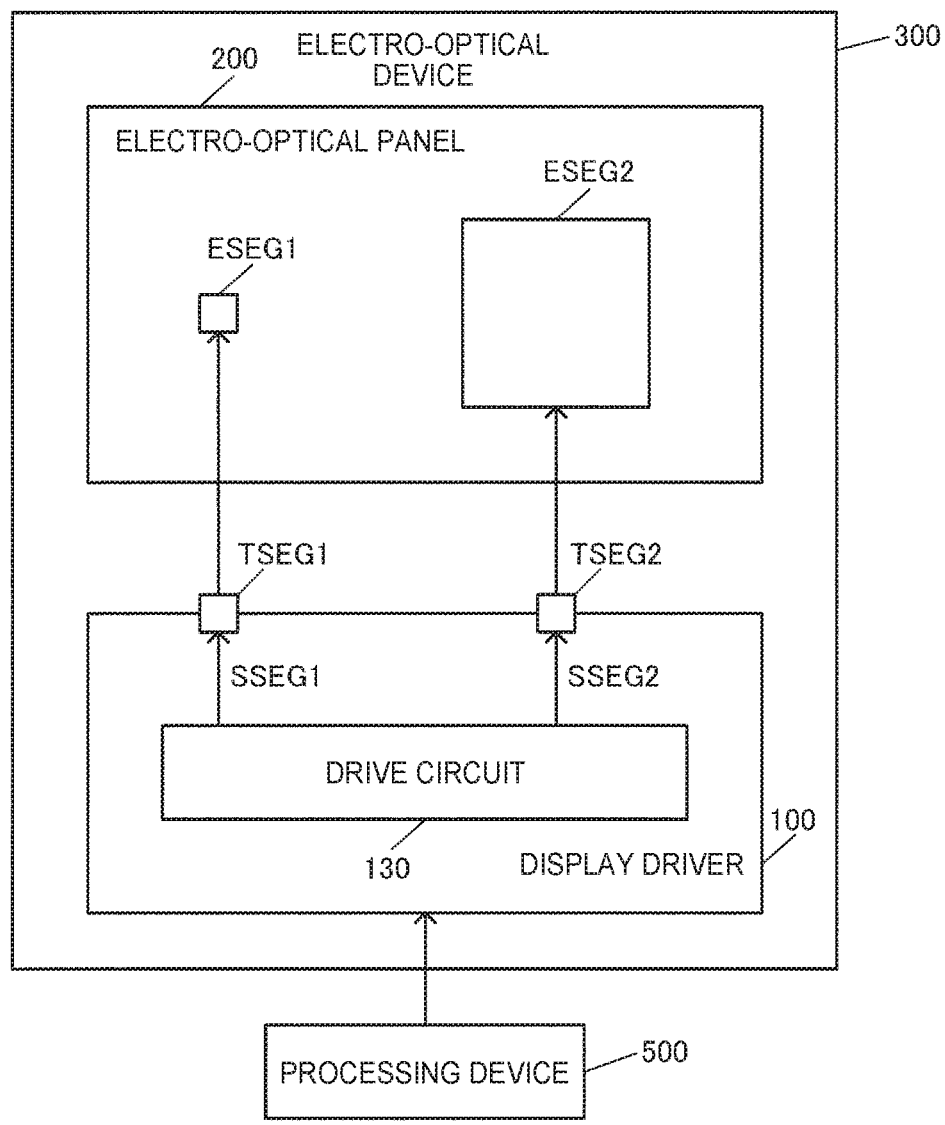
FIG. 2 illustrates exemplary configurations of a display driver and an electro-optical device.

FIG. 2 shows an exemplary configuration of a display driver 100 of the present embodiment, and an exemplary configuration of an electro-optical device 300 including the display driver 100. The electro-optical device 300 includes the electro-optical panel 200 and the display driver 100 that drives the electro-optical panel 200.

The electro-optical panel 200 adopts a static drive method. That is, the electro-optical panel 200 includes a first glass substrate, a second glass substrate, and liquid crystal. The liquid crystal is enclosed between the first glass substrate and the second glass substrate. A segment electrode is provided in the first glass substrate, and a common electrode is provided in the second glass substrate. The display driver 100 outputs a segment drive signal to the segment electrode and a common drive signal to the common electrode. With this, a drive signal whose voltage is a potential difference between the segment drive signal and the common drive signal is applied to the liquid crystal between the segment electrode and the common electrode. The segment electrode and the common electrode are transparent electrodes, and are made of ITO (Indium Tin Oxide), for example.

The display driver 100 is an integrated circuit (IC) device. The display driver 100 is an IC manufactured through a semiconductor process, and is a semiconductor chip in which circuit elements are formed on a semiconductor substrate. The display driver 100, which is an integrated circuit device, is mounted on a glass substrate of the electro-optical panel 200. For example, the display driver 100 is mounted on the first glass substrate on which the segment electrode is provided. Alternatively, a configuration may be adopted in which the display driver 100 is mounted on a circuit substrate, and the circuit substrate and the electro-optical panel 200 are coupled by a flexible substrate. The display driver 100 includes a terminal TSEG1, which is a first drive terminal, a terminal TSEG2, which is a second drive terminal, and a drive circuit 130.

The terminal TSEG1 can be connected to a segment electrode ESEG1 provided in the electro-optical panel 200. The terminal TSEG2 can be connected to a segment electrode ESEG2 that is provided in the electro-optical panel 200 and whose area is larger than that of the segment electrode ESEG1. The segment electrodes ESEG1 and ESEG2 are respectively a first segment electrode and a second segment electrode. The terminals of the display driver 100 are terminals for electrically coupling the display driver 100 and devices outside the display driver 100, and are pads of a semiconductor chip. Alternatively, the terminals may be conductive bumps or lead terminals of an IC package. The terminals TSEG1 and TSEG2 and the segment electrodes ESEG1 and ESEG2 are connected by segment signal lines formed on the glass substrate of the electro-optical panel 200. The segment signal lines are formed by ITO similarly to the segment electrodes, for example.

The drive circuit 130 outputs a PWM segment drive signal SSEG1 to the terminal TSEG1, and outputs a PWM segment drive signal SSEG2 to the terminal TSEG2. The segment drive signals SSEG1 and SSEG2 are respectively a first segment drive signal and a second segment drive signal. The PWM duty ratio of the segment drive signal SSEG1 will be called a first duty ratio, and the PWM duty ratio of the segment drive signal SSEG2 will be called a second duty ratio. When the same effective voltages are applied to the segment electrodes ESEG1 and ESEG2, the first duty ratio is smaller than the second duty ratio.

Figure 3:
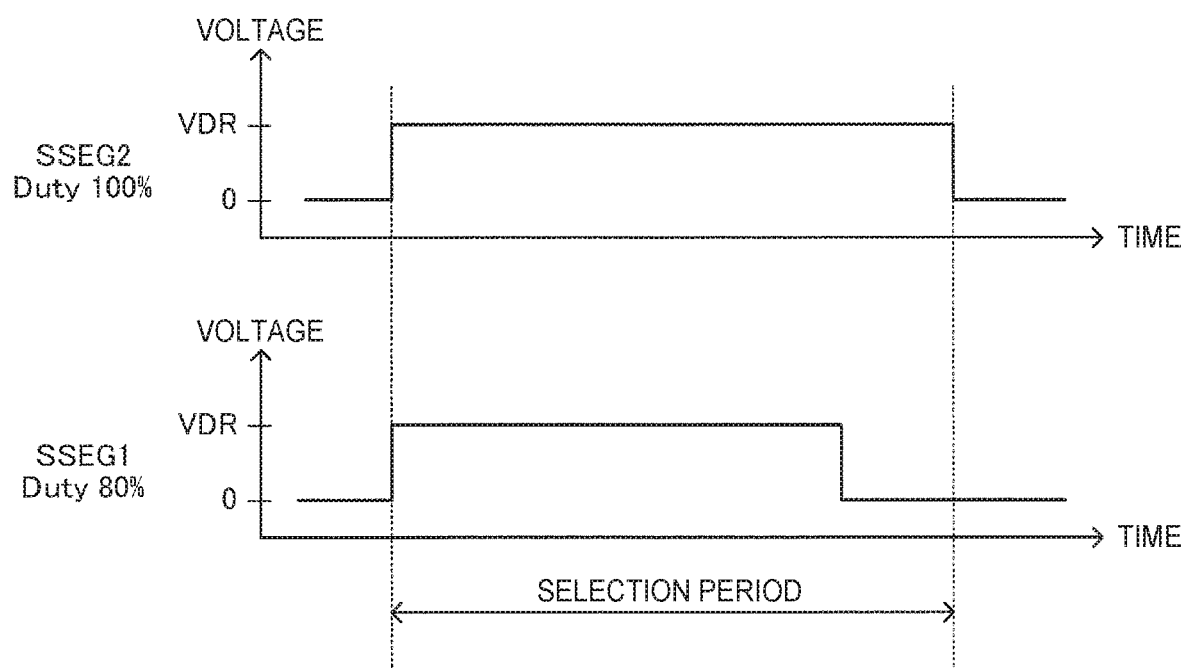
FIG. 3 shows exemplary segment drive signals at a maximum effective voltage.

FIG. 3 shows an example of the segment drive signals SSEG1 and SSEG2 when the effective voltage is a voltage VM in FIG. 1. Here, the duty ratio is defined as the ratio between the period in which the segment drive signal is at a high level and a selection period. The selection period is also referred to as a frame, and the length of the selection period is an inverse of a frame frequency in PWM driving. The frame frequency is a rate at which the polarity is inverted in polarity inversion driving.

As shown in FIG. 3, the voltage amplitudes of the segment drive signals SSEG1 and SSEG2 are the same voltage VDR. The first duty ratio of the segment drive signal SSEG1 to be output to the small segment electrode ESEG1 is 80%, and the second duty ratio of the segment drive signal SSEG2 to be output to the large segment electrode ESEG2 is 100%. With this, the effective voltage VM is applied to both the cells having the segment electrodes ESEG1 and ESEG2.

According to the present embodiment, the duty ratio to be set is reduced as the capacitive load of a segment electrode decreases. With this, the same effective voltage is applied to the segment electrodes ESEG1 and ESEG2 whose capacitive loads are different, and as a result, the same transmittance can be obtained in the two cells whose areas are different. Also, according to the present embodiment, the effective voltages are made to be the same by adjusting the duty ratios, and therefore the voltage amplitudes of the segment drive signals SSEG1 and SSEG2 can be made to be the same. With this, one voltage VDR need only be supplied to the drive circuit 130 as the power supply voltage. Therefore, a plurality of power supply circuits need not be provided, and the power supply circuit of the display driver 100 can be simplified.

Also, in the present embodiment, the maximum effective voltage is the voltage VM in FIG. 1, and the second duty ratio when the maximum effective voltage is applied to the segment electrode ESEG2 is 100%. The first duty ratio when the maximum effective voltage is applied to the segment electrode ESEG1 is less than 100%. For example, the first duty ratio when the maximum effective voltage is applied to the segment electrode ESEG1 may be 90% or less.

Assume that the duty ratio when the maximum effective voltage is applied to the segment electrode ESEG1 whose capacitive load is relatively small is 100%. In this case, the duty ratio when the maximum effective voltage is applied to the segment electrode ESEG2 whose capacitive load is relatively large exceeds 100%. According to the present embodiment, as a result of the duty ratio when the maximum effective voltage is applied to the segment electrode ESEG2 being set to 100%, the maximum effective voltage can be applied to both the segment electrodes ESEG1 and ESEG2. With this, two cells whose areas are different can be caused to enter an ON state by applying the maximum effective voltage.

Also, in the present embodiment, the area of the segment electrode ESEG2 is ten times or more the area of the segment electrode ESEG1. Also, the area of the segment electrode ESEG2 may be 100 times or more the area of the segment electrode ESEG1. For example, when the cell having the segment electrode ESEG2 is a liquid crystal shutter, which will be described later with reference to FIG. 11 or the like, it is envisioned that the area thereof is 100 times or more the area of the segment electrode ESEG1 that forms a cell of icon. Note that the area of the segment electrode ESEG2 is not limited to an area that is ten times or more or 100 times or more the area of the segment electrode ESEG1, and need only be more than one time the area of the segment electrode ESEG1.

As described above, the capacitive load seen from the display driver 100 increases as the area of a segment electrode increases, and therefore the effective voltage applied to the segment electrode decreases. In the present embodiment, the PWM duty ratio is increased with respect to a segment electrode whose capacitive load is large, and as a result, the effective voltage is suppressed from decreasing.

Also, in the present embodiment, the segment electrode ESEG1 is a segment electrode of a first icon. The second segment electrode ESEG2 is a segment electrode of a second icon. That is, the second icon is an icon whose area is larger than that of the first icon. The area of an icon is the same as the area of a portion that is tone-displayed by PWM driving, that is, the same as the area of the segment electrode that constitutes the icon.

According to the present embodiment, when the tone values are the same, the same transmittance of liquid crystal can be obtained in the first icon and the second icon. With this, the same contrast can be obtained in the first icon and the second icon whose areas are different. The contrast means the brightness of icon display with respect to the tone value.

Also, in the present embodiment, the segment electrode ESEG1 is a segment electrode of an icon. The segment electrode ESEG2 is a segment electrode of a liquid crystal shutter. That is, the area of the liquid crystal shutter is larger than the area of the icon. The area of the liquid crystal shutter is the same as the area of a portion that is controlled to be transmissive or non-transmissive by driving, that is, the area of the segment electrode that constitutes the liquid crystal shutter.

According to the present embodiment, a maximum effective voltage can be applied to the liquid crystal shutter whose capacitive load is large. With this, the liquid crystal shutter can be reliably controlled to be transmissive or non-transmissive. Also, according to the present embodiment, an overvoltage can be suppressed from being applied to the icon whose capacitive load is small.

2. First Detailed Exemplary Configuration

Figure 4:
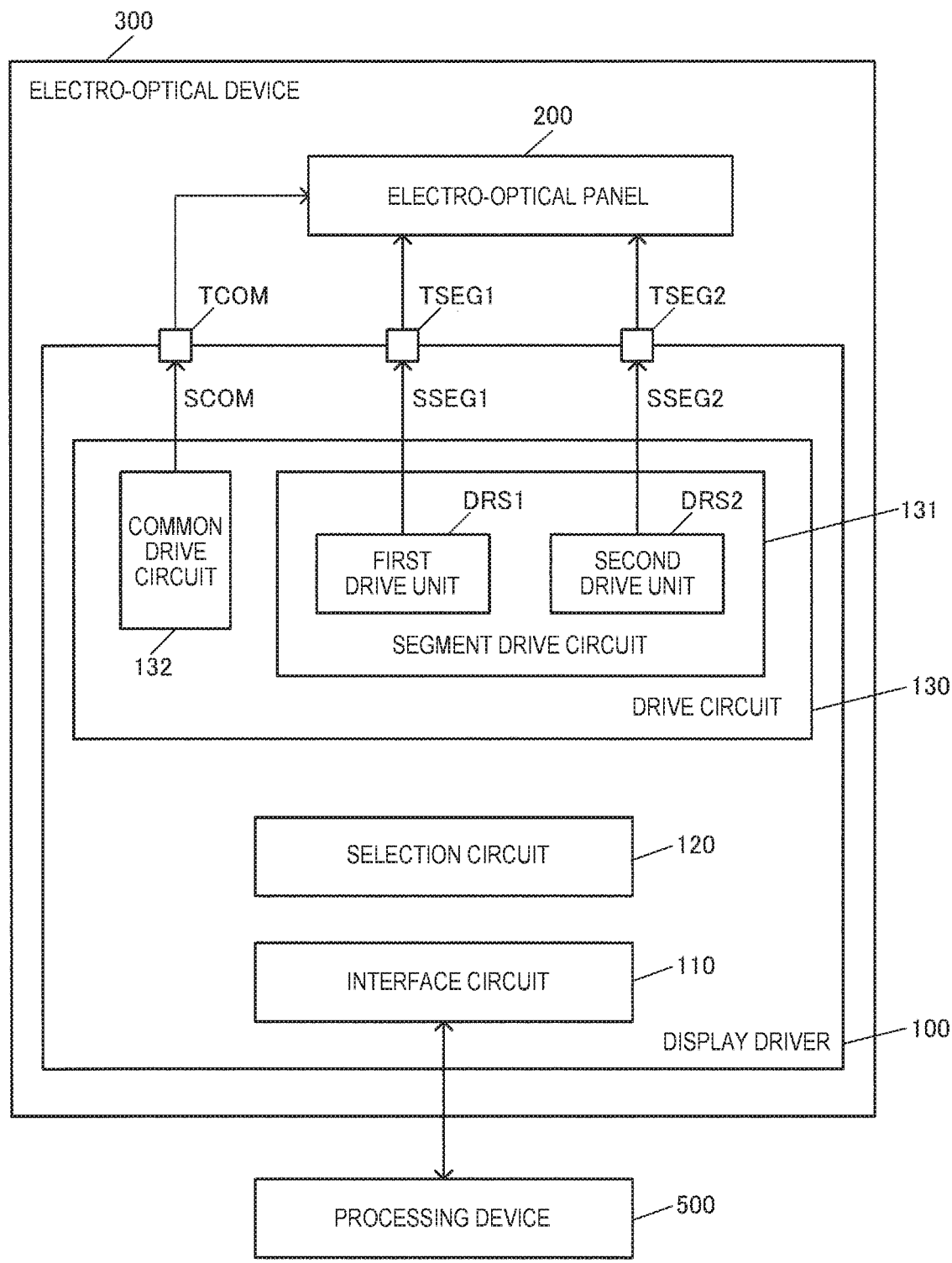
FIG. 4 shows a first detailed exemplary configuration of the display driver.

FIG. 4 shows a first detailed exemplary configuration of the display driver 100. The display driver 100 includes an interface circuit 110, a selection circuit 120, the drive circuit 130, and terminals TSEG1, TSEG2, and TCOM. The terminal TCOM is a common drive terminal.

The interface circuit 110 receives instruction information from an external device. Specifically, the interface circuit 110 performs inter-circuit communication between a processing device 500 and the display driver 100. The processing device 500 transmits tone data and instruction information, and the interface circuit 110 receives the tone data and the instruction information. The tone data is data indicating the tone to be displayed in a liquid crystal cell. The tone data is also referred to as display data. The instruction information is information for instructing the correspondence relationship between each tone value of the tone data and the duty ratio of the drive signal. For example, the interface circuit 110 is a serial interface circuit of an I2C (Inter Integrated Circuit) system, an SPI (Serial Peripheral Interface) system, or the like.

Note that the processing device 500 is a host device of the display driver 100, and is a processor or a display controller, for example. The processor is a CPU, a microcomputer, or the like. Note that the processing device 500 may be a circuit device that is constituted by a plurality of circuit components. For example, the processing device 500 may be an ECU (Electronic Control Unit) in an in-vehicle electronic apparatus.

The selection circuit 120 selects n pieces of duty ratio data from k pieces of duty ratio data based on the instruction information. The duty ratio data that has been selected is referred to as selected duty ratio data. n is an integer that is smaller than k. n corresponds to a number obtained by adding one to the number of tones indicated by the tone data. In the following, a case where k=75, the number of tones is 16, and n=17 will be described as an example.

Figures 5, 6:
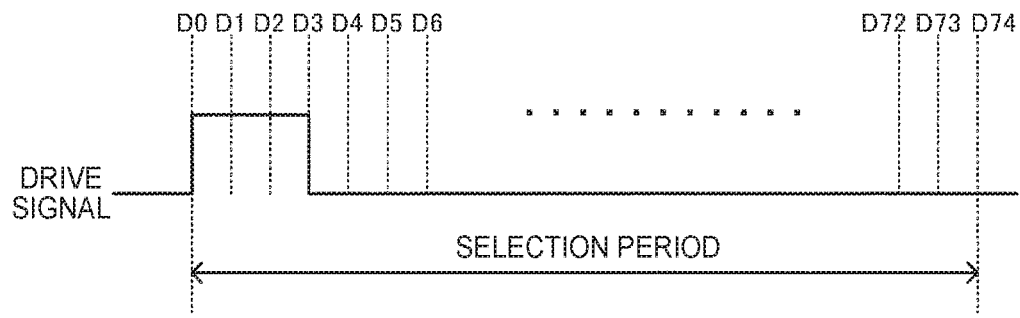
FIG. 5 is a diagram illustrating operations of a selection circuit.
FIG. 6 shows exemplary instruction information to be received by an interface circuit.

FIG. 5 is a diagram illustrating operations of the selection circuit 120. Pieces of duty ratio data D0 to D74 correspond to 75 pieces of duty ratio that are different to each other. Specifically, the 75 pieces of duty ratio data D0 to D74 are pieces of data respectively indicating duty ratios of PWM driving at equal intervals. That is, the duty ratio data Di corresponds to a duty ratio i/74, where i is an integer of 0 or more and 74 or less.

The selection circuit 120 selects 17 pieces of duty ratio data from the pieces of duty ratio data D0 to D74. Hereinafter, the duty ratio data that has been selected is referred to as selected duty ratio data. Specifically, the selection circuit 120 selects 16 pieces of duty ratio data by selecting one of the pieces of duty ratio data D0 to D74 for each of tone values 0 to 15. This is selected duty ratio data for the segment electrode ESEG1. Also, the selection circuit 120 selects one of the pieces of duty ratio data D0 to D74 as 17th duty ratio data. This is selected duty ratio data for the segment electrode ESEG2. When FIG. 5 shows a drive signal corresponding to a tone value 1, FIG. 5 illustrates that duty ratio data D3 is selected for the tone value 1. Which of the pieces of duty ratio data D0 to D74 is selected for each tone value can be arbitrarily set by the instruction information.

Note that, in FIG. 5, the 75 pieces of duty ratio data D0 to D74 correspond to duty ratios at equal intervals, but there is no limitation thereto, and the intervals of the duty ratios corresponding to the 75 pieces of duty ratio data D0 to D74 may not be equal.

The drive circuit 130 selects output duty ratio data corresponding to the tone data from the 17 pieces of selected duty ratio data, and drives the electro-optical panel 200 by performing PWM driving at the duty ratio indicated by the selected output duty ratio data. For example, it is assumed that the tone value indicated by the tone data is 1 and the selected duty ratio data corresponding to the tone value 1 is D3. The duty ratio indicated by D3 is 3/74. In this case, the drive circuit 130 selects D3 corresponding to the tone value 1 as the output duty ratio data, and outputs the segment drive signal and the common drive signal such that the duty ratio of the drive signal is 3/74 based on the output duty ratio data D3.

Specifically, the drive circuit 130 includes a segment drive circuit 131 and a common drive circuit 132. The segment drive circuit 131 includes a first drive unit DRS1 and a second drive unit DRS2.

The first drive unit DRS1 outputs the segment drive signal SSEG1 at the first duty ratio, based on tone data designating one of a plurality of display tones, that corresponds to the tone data. The tone data indicates one of 16 tones. The second drive unit DRS2 outputs the segment drive signal SSEG2 at the fixed second duty ratio based on fixed tone data. The fixed tone data is tone data indicating a predetermined one tone. As described above, 16 pieces of selected duty ratio data for the segment electrode ESEG1 and one selected duty ratio data for the segment electrode ESEG2 are separately selected. That is, 16 pieces of selected duty ratio data are selected for the respective 16 tones indicated by the tone data designating the plurality of display tones, and one selected duty ratio data is selected for one tone of the fixed tone data. 17 pieces of selected duty ratio data are obtained by adding these pieces of data. The fixed tone data may be data indicating any tone value. That is, the selected duty ratio data selected by the fixed tone data need only indicate a duty ratio that is larger than the maximum duty ratio of duty ratios indicated by 16 pieces of selected duty ratio data corresponding to 16 tones. The common drive circuit 132 outputs a common drive signal SCOM to the terminal TCOM. The common drive signal SCOM is output to the common electrode in the electro-optical panel 200 from the terminal TCOM. Note that the fixed tone data is tone data indicating a predetermined one tone, but the segment drive signal SSEG2 includes a signal having a duty ratio 0%, in addition to the signal having a second duty ratio based on the fixed tone data.

According to the present embodiment, as a result of using 75 pieces of duty ratio data larger than 17 pieces, 16 pieces of duty ratio data corresponding to the 16 tones indicated by tone data designating a plurality of display tones and one duty ratio data corresponding to the fixed tone data can be arbitrarily set. With this, the 16 pieces of duty ratio data corresponding to 16 tones can be arbitrarily set, and as a result, a drive signal having a duty ratio that changes at unequal intervals with respect to tone values can be realized. The VT characteristic of liquid crystal nonlinearly changes with respect to an applied voltage, but as a result of being able to set the duty ratios at unequal intervals, the duty ratios can be set in accordance with the VT characteristic. With this, the duty ratios of PWM driving that are suitable for the VT characteristic of any liquid crystal can be set. Note that the VT characteristic is a characteristic indicating the relationship between a voltage applied to liquid crystal and transmittance of the liquid crystal. Also, one duty ratio data corresponding to the fixed tone data can be arbitrarily set, and as a result, a drive signal that causes an effective voltage suitable to the segment electrode ESEG2 whose area is relatively large can be applied.

Also, according to the present embodiment, as a result of transmitting instruction information from the outside of the display driver 100, the 17 pieces of duty ratio data can be arbitrarily set. With this, the display driver can be combined with various liquid crystal panels without re-designing the display driver.

Also, according to the present embodiment, tone display is performed in the cell including the segment electrode ESEG1 whose area is small, and the cell including the segment electrode ESEG2 whose area is large is binary-controlled. The binary control means that the cell is controlled to be ON or OFF, and the transmittance of liquid crystal is controlled to be 0% or 100%, for example. For example, the cell including the segment electrode ESEG2 is an icon whose area is relatively large, or a liquid crystal shutter. In the present embodiment, such a cell can be binary controlled to be ON or OFF.

Note that a case has been described above where the duty ratio of the segment drive signal SSEG2 is fixed, but there is no limitation thereto, and the second drive unit DRS2 may output a segment drive signal SSEG2 having a duty ratio in accordance with the tone value. In this case, duty ratios corresponding to respective tones are set to values from 0% to 100%, the duty ratio 100% being set as the maximum tone.

In the following, the detailed operations of the display driver 100 will be described. FIG. 6 shows an exemplary instruction information to be received by the interface circuit 110. The tone values 0 to 15 are described by binary numbers. The instruction information includes first instruction information corresponding to the terminal TSEG1 and second instruction information corresponding to the terminal TSEG2. The first instruction information is information in which duty ratio data is associated with each of tone values 0000 to 1111. The second instruction information is one duty ratio data associated with a fixed duty ratio. The duty ratio data of the second instruction information is D74, and corresponds to a duty ratio 100%. On the other hand, in the first instruction information, the duty ratio data of a maximum tone value 1111 is D60, and corresponds to a duty ratio 80%.

The processing device 500 transmits the first instruction information and the second instruction information to the interface circuit 110 along with a command for setting the duty ratios. The selection circuit 120 selects the duty ratio data instructed by the first instruction information as 16 pieces of selected duty ratio data. Also, the selection circuit 120 selects the duty ratio data instructed by the second instruction information as 17th selected duty ratio data. The second drive unit DRS2 outputs the segment drive signal SSEG2 having a fixed duty ratio that is set by the 17th selected duty ratio data.

Note that instead of a configuration in which the interface circuit 110 receives the second instruction information, the configuration may be such that the second instruction information is set in the display driver 100 in advance. For example, the second instruction information may be written to a storage unit 180 in FIG. 10 in advance when the display driver 100 or the electro-optical device 300 is manufactured or the like.

Also, a case has been described above where the first instruction information is a table in which duty ratio data is associated with each of tone values 0000 to 1111, but the first instruction information is not limited thereto. For example, the first instruction information may also be information for setting the model of the electro-optical panel 200. In this case, a plurality of tables are written into the storage unit 180 in FIG. 10 when the display driver 100 or the electro-optical device 300 is manufactured or the like. One table is associated with one model of the liquid crystal panel. The selection circuit 120 may also select 16 pieces of selected duty ratio data by reading out a table associated with the model set by the first instruction information.

Figure 7:
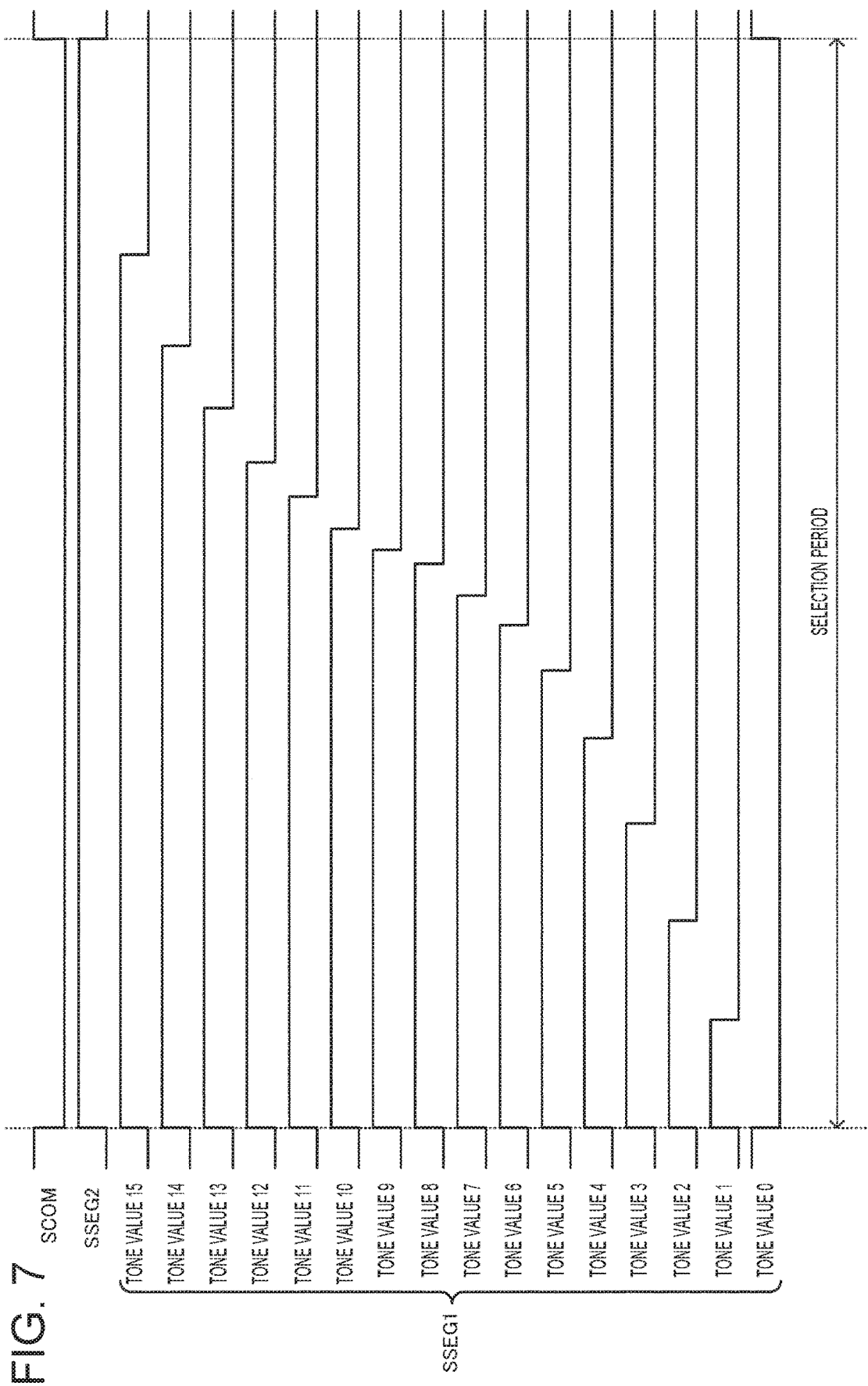
FIG. 7 shows exemplary waveforms of a segment drive signal and a common drive signal.

FIG. 7 shows exemplary waveforms of the segment drive signals SSEG1 and SSEG2 and the common drive signal SCOM. In FIG. 7, exemplary waveforms in a selection period in negative polarity driving are shown. Note that the low level of each signal corresponds to 0 V, and the high level corresponds to the voltage VDR in FIG. 3.

The common drive signal SCOM is at a low level in the selection period. The segment drive signal SSEG2 for driving the segment electrode ESEG2 whose area is large is a PWM signal having a duty ratio at high (ratio of the period at a high level in one cycle) of 100%. The duty ratio at high of the segment drive signal SSEG1 for driving the segment electrode ESEG1 whose area is small changes in accordance with the tone value. According to the present embodiment, a drive signal having a fixed duty ratio 100% is applied to a cell whose area is large, and a drive signal having a duty ratio in accordance with the tone value is applied to a cell whose area is small. The duty ratios of the segment drive signal SSEG1 are set at unequal intervals with respect to tone values. This is realized by selecting 16 pieces of selected duty ratio data corresponding to 16 tones from the 75 pieces of duty ratio data, as described above.

Figure 8:
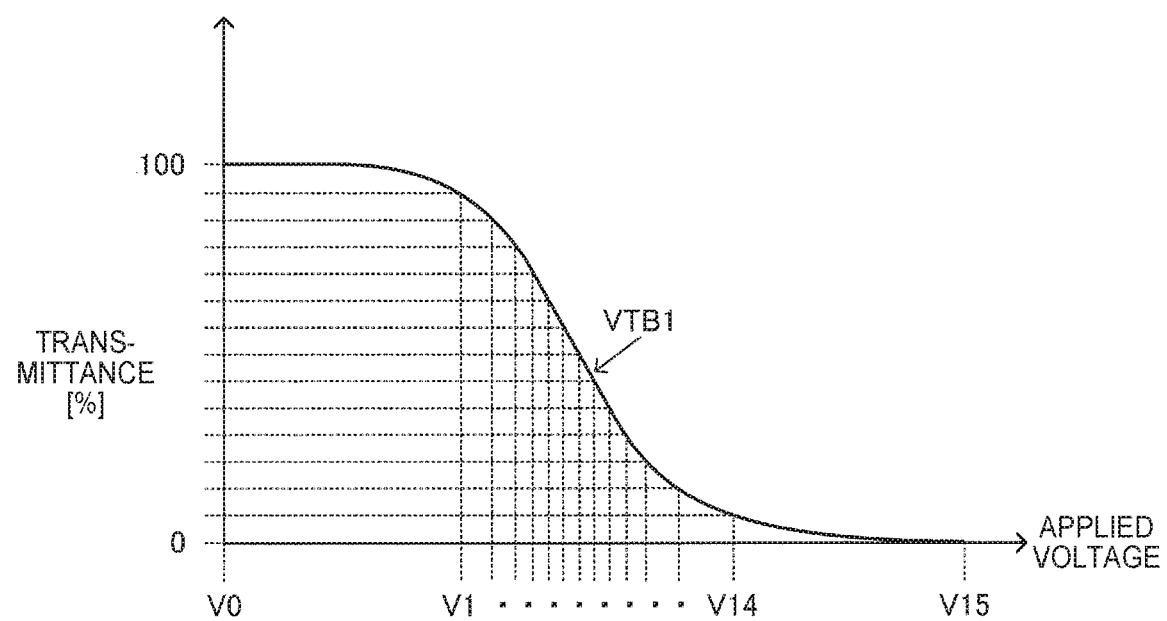
FIG. 8 shows an exemplary relationship between the effective voltage of a drive signal and the transmittance of liquid crystal.

FIG. 8 shows an exemplary relationship between the effective voltage when the drive signal SSEG1 is applied to the segment electrode ESEG1 and the transmittance of liquid crystal. Effective voltages V0 to V15 are respectively effective voltages of the drive signal SSEG1 at tone values 0 to 15. As shown in FIG. 7, the duty ratios of the drive signal SSEG1 are set at unequal intervals, and therefore the effective voltages V0 to V15 are at unequal intervals. In the VT characteristic VTB1 in target liquid crystal, the transmittance thereof changes at equal intervals with respect to the effective voltage V0 to V15 at unequal intervals. That is, the 16 pieces of selected duty ratio data are selected such that the transmittance changes at equal intervals with respect to the tone values 0 to 15. As a result of selecting 16 pieces of selected duty ratio data from the 75 pieces of selected duty ratio data, such transmittance that changes at equal intervals can be realized. Note that the difference in period at a high level in the waveforms in FIG. 7 between tone values of SSEG1 differs from the difference in voltage of applied voltages V0 to V15 in FIG. 8, due to the convenience of creating diagrams.

The VT characteristic changes in accordance with the type of liquid crystal, and therefore the effective voltages V0 to V15 with respect to tone values 0 to 15 also change. In the present embodiment, the duty ratios with respect to the tone values 0 to 15 can be instructed by the instruction information. With this, in a liquid crystal panel using various types of liquid crystal, the duty ratio of a drive signal can be adjusted such that the transmittance with respect to tone values 0 to 15 changes at equal intervals. Note that the effective voltage when the drive signal SSEG2 in FIG. 7 is applied to the segment electrode ESEG2 is almost the same as V15 in FIG. 8.

Figure 9:
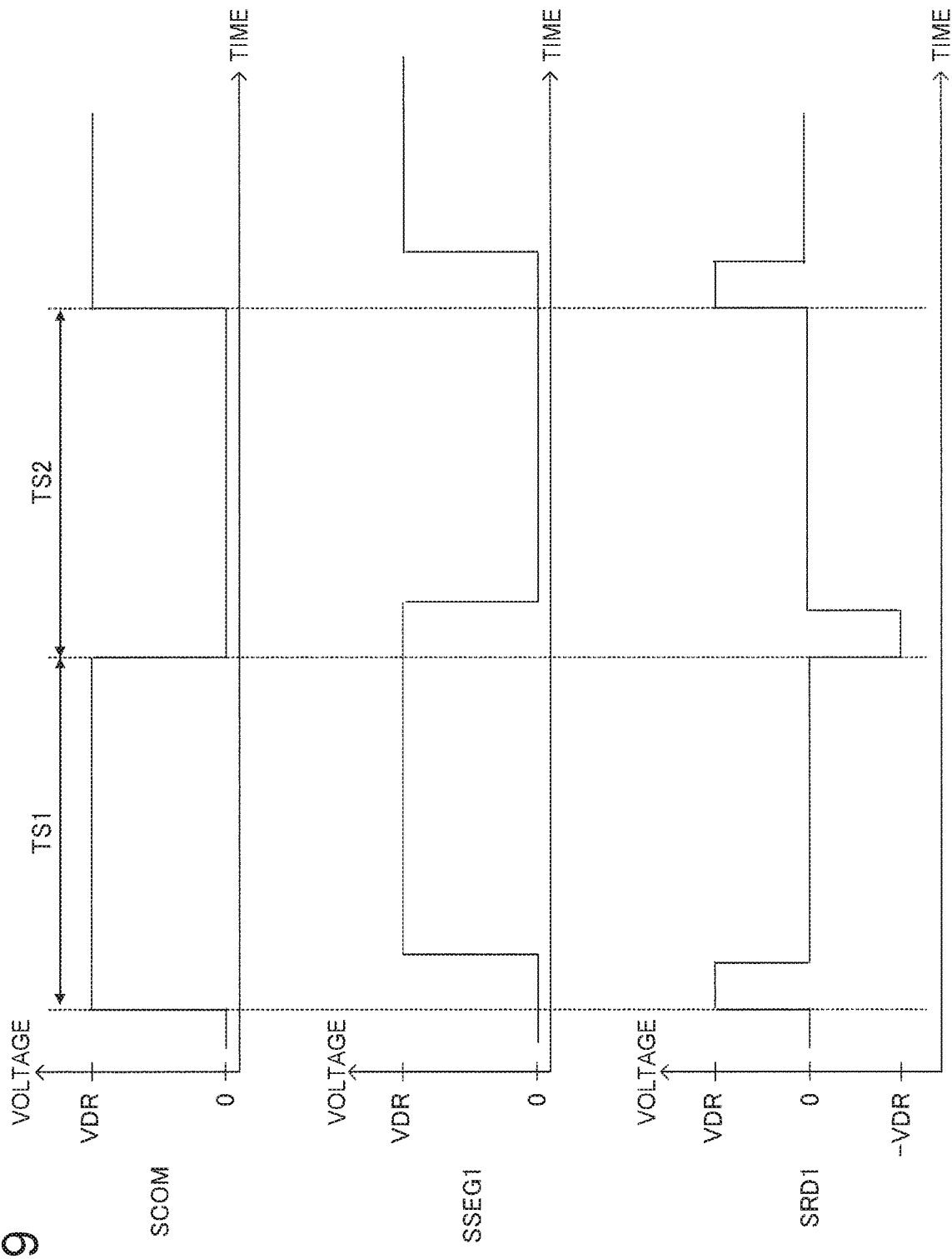
FIG. 9 shows exemplary signal waveforms in polarity inversion driving.

FIG. 9 shows exemplary signal waveforms in polarity inversion driving. TS1 denotes a selection period when positive polarity driving is performed, and TS2 denotes a selection period when negative polarity driving is performed. In the following, the period TS1 is referred to as a positive polarity selection period, and the period TS2 is referred to as a negative polarity selection period. In the following, a case of the segment drive signal SSEG1 will be described as an example, but the same applies to the segment drive signal SSEG2.

In the positive polarity selection period TS1, the common drive circuit 132 outputs a common drive signal SCOM at a voltage VDR, and the first drive unit DRS1 outputs the segment drive signal SSEG1 that transitions from 0 V to the voltage VDR. The timing at which the segment drive signal SSEG1 transitions is determined by the tone data. That is, the duty ratio at 0 V in the segment drive signal SSEG1 is the duty ratio corresponding to the tone data. The voltage of a drive signal SDR1 is a potential difference between the common drive signal SCOM and the segment drive signal SSEG1. In the drive signal SDR1, the duty ratio at the voltage VDR is the duty ratio corresponding to the tone data.

In the negative polarity selection period TS2, the common drive signal SCOM outputs the common drive signal SCOM at 0 V, and the first drive unit DRS1 outputs the segment drive signal SSEG1 that transitions from the voltage VDR to 0 V. In the segment drive signal SSEG1, the duty ratio at voltage VDR is the duty ratio corresponding to the tone data. With this, in the drive signal SDR1, the duty ratio at voltage −VDR is the duty ratio corresponding to the tone data.

3. Second Detailed Exemplary Configuration

Figure 10:
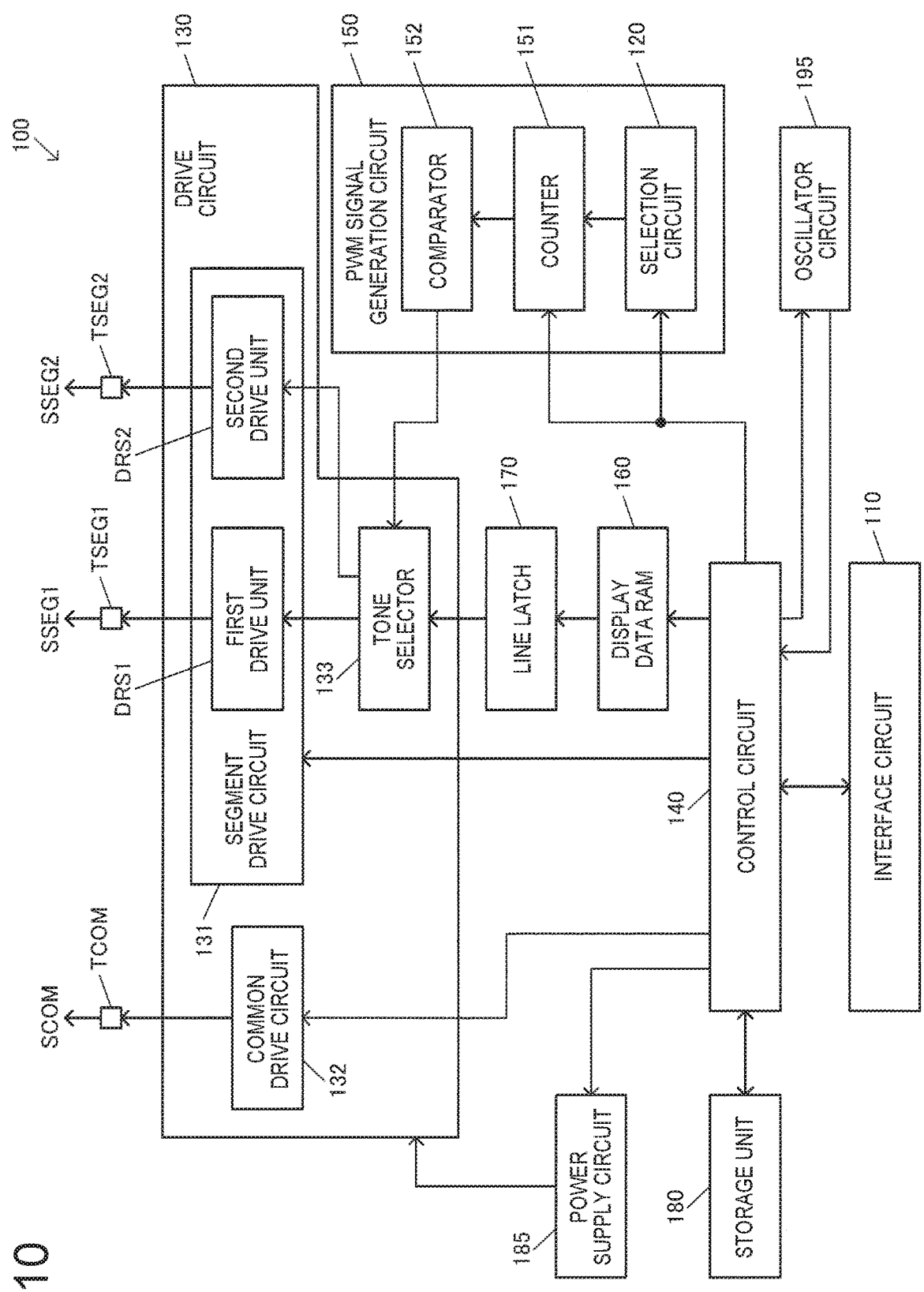
FIG. 10 shows a second detailed exemplary configuration of the display driver.

FIG. 10 shows a second detailed exemplary configuration of the display driver 100. The display driver 100 includes an interface circuit 110, a drive circuit 130, a control circuit 140, a PWM signal generation circuit 150, a display data RAM 160, a line latch 170, a storage unit 180, a power supply circuit 185, and an oscillator circuit 195. The constituent elements that are the same as the constituent elements that have been already described are given the same reference signs, and the description of the constituent elements will be appropriately omitted.

The oscillator circuit 195 generates a clock signal, and outputs the clock signal to the control circuit 140. The oscillator circuit 195 is an RC oscillator circuit, a ring oscillator, or a multivibrator, for example. Alternatively, the oscillator circuit 195 may be an oscillator circuit that causes a vibrator to oscillate.

The control circuit 140 is a logic circuit that operates based on the clock signal from the oscillator circuit 195. The control circuit 140 performs control of a display timing, an operation setting of the display driver 100, and the like. Specifically, the control circuit 140 writes the tone data received by the interface circuit 110 to the display data RAM 160. Also, the control circuit 140 writes the setting data received by the interface circuit 110 to the storage unit 180. The setting data is information for instructing the frame frequency, instruction information for instructing the duty ratio of a drive signal, and the like. Also, the control circuit 140 outputs a polarity inversion signal generated based on the clock signal to the drive circuit 130.

The storage unit 180 stores setting data for setting the operations of the display driver 100. The storage unit 180 is a register or a memory, for example. The memory may be a volatile memory such as SRAM or DRAM, or a nonvolatile memory such as EEPROM or a fuse memory.

The line latch 170 reads out tone data that is to be displayed in one selection period from the display data RAM 160, and latches the read-out tone data. It is assumed that the display driver 100 includes p segment drive outputs, where p is an integer of one or more. In this case, the line latch 170 latches p pieces of tone data corresponding to the p segment drive outputs.

The PWM signal generation circuit 150 generates 17 PWM signals corresponding to 17 pieces of selected duty ratio data. The 16 pieces of selected duty ratio data are selected based on the first instruction information in FIG. 6, and the $17^{th}$ selected duty ratio data is selected based on the second instruction information in FIG. 6. The PWM signal generation circuit 150 includes the selection circuit 120, a counter 151, and a comparator 152.

The control circuit 140 reads out instruction information from the storage unit 180, and outputs the instruction information to the selection circuit 120. The selection circuit 120 selects 17 pieces of selected duty ratio data based on the instruction information.

The control circuit 140 outputs a clock signal for count operation to the counter 151 based on the clock signal. The counter 151 performs count operation based on the clock signal for count operation. Specifically, the clock signal for count operation has a frequency 75 times the frame frequency. The counter 151 is reset at the start of a selection period, and counts from 0 to 75 in the selection period.

In the configuration shown in FIG. 10, the selected duty ratio data is a count value corresponding to its duty ratio. The comparator 152 compares the count value of the counter 151 with the count value indicated by the selected duty ratio data. When the count value of the counter 151 matches the count value indicated by the selected duty ratio data, the comparator 152 inverts the logic level of the PWM signal. With this, a PWM signal having the duty ratio indicated by the selected duty ratio data is generated. This operation is performed with respect to each of the 17 pieces of selected duty ratio data, and as a result 17 PWM signals are generated.

The drive circuit 130 drives the electro-optical panel 200 based on the tone data output from the line latch 170 and the PWM signal output from the PWM signal generation circuit 150. The drive circuit 130 includes the segment drive circuit 131, the common drive circuit 132, and a tone selector 133. The segment drive circuit 131 includes the first drive unit DRS1 and the second drive unit DRS2. Note that, a case where the segment drive output has two outputs is illustrated in FIG. 10, but the segment drive output may have three or more outputs.

The tone selector 133 selects a PWM signal corresponding to the tone value indicated by tone data output from the line latch 170 from the 16 PWM signals, and outputs the selected PWM signal to the first drive unit DRS1 as a first PWM signal. The 16 PWM signals are PWM signals generated based on the first instruction information in FIG. 6. Also, the tone selector 133 outputs the PWM signal corresponding to the tone value of the fixed tone data to the second drive unit DRS2 as a second PWM signal. This PWM signal is the 17th PWM signal generated based on the second instruction information in FIG. 6.

The first drive unit DRS1 outputs the segment drive signal SSEG1 based on the first PWM signal, and the second drive unit DRS2 outputs the segment drive signal SSEG2 based on the second PWM signal. Specifically, the first drive unit DRS1 outputs the segment drive signal SSEG1 by inverting the polarity of the first PWM signal based on the polarity inversion signal, and buffering the polarity-inverted signal. For example, the first drive unit DRS1 is constituted by a logic circuit that performs processing for inverting the polarity of the first PWM signal and a drive amplifier circuit that outputs the segment drive signal SSEG1. The second drive unit DRS2 has the similar configuration.

The common drive circuit 132 drives the common electrode of the electro-optical panel 200 by outputting the common drive signal SCOM based on the polarity inversion signal. The polarity inversion signal is a signal indicating the polarity in a selection period, and a signal whose level changes between a high level and a low level for each selection period. The common drive circuit 132 outputs the common drive signal SCOM by buffering the polarity inversion signal. For example, the common drive circuit 132 is constituted by a drive amplifier circuit that outputs the common drive signal SCOM.

The power supply circuit 185 generates a power supply voltage, and supplies the power supply voltage to the drive circuit 130. The drive circuit 130 operates with this power supply voltage. Specifically, the segment drive circuit 131 outputs the segment drive signals SSEG1 and SSEG2 whose high level is at the power supply voltage. With this, the voltage amplitude is the same between the segment drive signals SSEG1 and SSEG2. Also, the common drive circuit 132 outputs the common drive signal SCOM whose high level is at the power supply voltage.

In the present embodiment, the voltage amplitudes of the segment drive signals SSEG1 and SSEG2 are the same, and the effective voltage thereof is adjusted by the PWM duty ratio. With this, the power supply circuit 185 need only generate one power supply voltage, and the power supply circuit 185 can be simplified compared with the case where a plurality of power supply voltages are generated.

4. Electro-Optical Device, Electronic Apparatus, and Mobile Body

FIG. 11 shows a detailed exemplary configuration of the electro-optical device 300. Note that, in the following, a case where the electro-optical panel 200 includes a liquid crystal shutter, and is combined with a matrix-type electro-optical panel will be described as an example, but the configuration of the electro-optical device 300 is not limited thereto. That is, the electro-optical device 300 need only include an electro-optical panel 200 that is driven by a static drive method, and a configuration may be adopted in which the electro-optical panel 200 is not provided with a liquid crystal shutter, and is provided with only an icon.

The electro-optical device 300 shown in FIG. 11 includes a first panel module 301, a second panel module 302, and a circuit substrate 303. Note that the constituent elements that are the same as the constituent elements that have been already described are given the same reference signs, and the description of the constituent elements will be appropriately omitted.

The first panel module 301 includes the electro-optical panel 200, the display driver 100, and a first flexible substrate FC1. In the following, the electro-optical panel 200 is referred to as a first electro-optical panel, and the display driver 100 is referred to as a first display driver.

The first electro-optical panel 200 includes a transmission control segment electrode ESHT. Also, the first electro-optical panel 200 can further include one or more display segment electrodes for displaying various display items.

The first display driver 100 is mounted on a glass substrate of the first electro-optical panel 200. The first display driver 100 is connected to the transmission control segment electrode ESHT and display segment electrodes by segment signal lines, and drives the segment electrodes by outputting segment drive signals to the segment signal lines.

One end of the first flexible substrate FC1 is to be coupled to the glass substrate of the first electro-optical panel 200. Specifically, the first flexible substrate FC1 includes communication signal lines for transmitting display data and the like from a display controller. The communication signal lines are to be coupled to one ends of interface signal lines provided on the glass substrate of the first electro-optical panel 200. The other ends of the interface signal lines are connected to the first display driver 100.

The second panel module 302 includes a matrix-type second electro-optical panel 202, a second display driver 102 that drives the second electro-optical panel 202, and a second flexible substrate FC2.

The second electro-optical panel 202 is an active matrix type liquid crystal panel such as a TFT (Thin Film Transistor) liquid crystal panel. Alternatively, the second electro-optical panel 202 may also be a light emission type display panel such as an EL (Electro Luminescence) display panel. The second electro-optical panel 202 includes a pixel array PARY in which a plurality of pixels are arranged in a matrix. In the following, the region where the pixel array PARY is arranged in the second electro-optical panel 202 is referred to as a display region.

The second display driver 102 is mounted on a glass substrate of the second electro-optical panel 202. The second display driver 102 is connected to the pixel array PARY by signal lines provided on the glass substrate of the second electro-optical panel 202, and caused the pixel array PARY to display an image by outputting data line drive signals and scan line drive signals to the signal lines.

One end of the second flexible substrate FC2 is to be coupled to the glass substrate of the second electro-optical panel 202. Specifically, the second flexible substrate FC2 includes communication signal lines for transmitting display data and the like from the display controller. The communication signal lines are to be coupled to one ends of interface signal lines provided on the glass substrate of the second electro-optical panel 202. The other ends of the interface signal lines are connected to the second display driver 102.

The circuit substrate 303 includes a substrate KB, and a first connector CNC1 provided on the substrate KB, and a second connector CNC2 provided on the substrate KB. The substrate KB is a printed substrate, for example. The first connector CNC1 is to be coupled to the other end of the first flexible substrate FC1. The second connector CNC2 is to be coupled to the other end of the second flexible substrate FC2.

As shown in FIG. 11, a plan view direction relative to the first electro-optical panel 200 is denoted as DZ. Also, directions orthogonal to the direction DZ are denoted as DX and DY. The direction DX and the direction DY are orthogonal to each other. In the first electro-optical panel 200, the region where the transmission control segment electrode ESHT is arranged corresponds to a liquid crystal shutter. In the following, the region is referred to as a transmission control region.

The first electro-optical panel 200 is arranged parallel to the plane defined by the direction DX and the direction DY. Similarly, the second electro-optical panel 202 is arranged parallel to the plane defined by the direction DX and the direction DY. The second electro-optical panel 202 is arranged separated from the first electro-optical panel 200 in the direction DZ. The light of a display image of the second electro-optical panel 202 passes through the transmission control region of the first electro-optical panel 200, and as a result, a user can view the display image of the second electro-optical panel 202.

The transmission control segment electrode ESHT overlaps the display region of the second electro-optical panel 202 in a plan view. For example, the size of the transmission control segment electrode ESHT is the same as the size of the display region of the pixel array PARY, and the first electro-optical panel 200 and the second electro-optical panel 202 are arranged such that the transmission control segment electrode ESHT matches the display region when viewed in a plan view in the direction DZ. Note that the size of the transmission control segment electrode ESHT may be larger than the size of the display region of the pixel array PARY. In this case, the first electro-optical panel 200 and the second electro-optical panel 202 are arranged such that the display region is positioned inside the transmission control segment electrode ESHT when viewed in a plan view in the direction DZ.

Note that, a state in which the connectors and the flexible substrates are not coupled is illustrated in FIG. 11, but in actuality, the connectors and the flexible substrates are coupled. Also, in FIG. 11, the first electro-optical panel 200 is illustrated so as to be separated from the second electro-optical panel 202, but in actuality, the first electro-optical panel 200 and the second electro-optical panel 202 are arranged so as to be adjacent to each other in the direction DZ.

Figure 12:
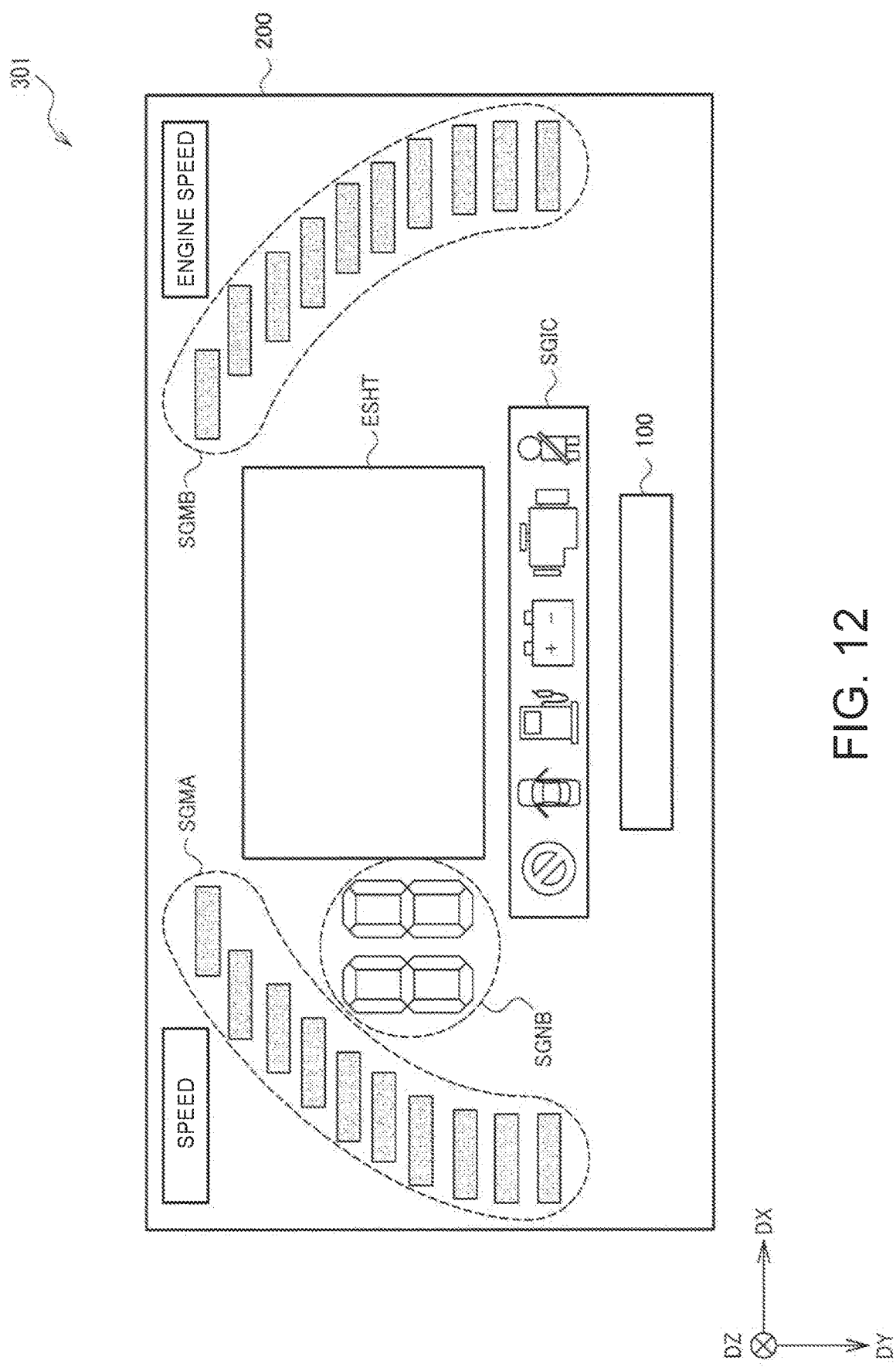
FIG. 12 shows a detailed exemplary configuration of a first electro-optical panel when the electro-optical device is applied to an in-vehicle cluster panel.

FIG. 12 shows a detailed exemplary configuration of the first electro-optical panel 200 when the electro-optical device 300 is applied to an in-vehicle cluster panel. Note that, illustrations of the segment signal lines and the flexible substrates are omitted in FIG. 12. Also, the dotted lines in FIG. 12 are merely for indicating the objects denoted by reference signs, and in actuality, the dotted lines are not displayed.

The first electro-optical panel 200 includes a segment electrode group SGMA for displaying a speedometer, a segment electrode group SGMB for displaying an engine speed meter, a segment electrode group SGNB for displaying numeric characters, a segment electrode group SGIC for displaying warning lights, and the transmission control segment electrode ESHT. The segment electrodes included in SGMA, SGMB, SGNB, and SGIC are display segment electrodes described above.

The first display driver 100 displays the meters, the numeric characters, and the warning lights by outputting drive signals to the segment electrodes of the segment electrode groups SGMB, SGNB, and SGIC, respectively. Also, the first display driver 100 controls the transmittance of the transmission control region by outputting a drive signal to the transmission control segment electrode ESHT.

In FIGS. 11 and 12, one of the display segment electrodes corresponds to the segment electrode ESEG1 in FIG. 2, and the transmission control segment electrode ESHT corresponds to the segment electrode ESEG2 whose area is larger than the $17^{th}$ segment electrode ESEG1 in FIG. 2. Alternatively, a segment electrode, of the display segment electrodes, whose area is relatively small may correspond to the segment electrode ESEG1 in FIG. 2, and a segment electrode, of the display segment electrodes, whose area is relatively large may correspond to the segment electrode ESEG2 in FIG. 2.

Figure 13:
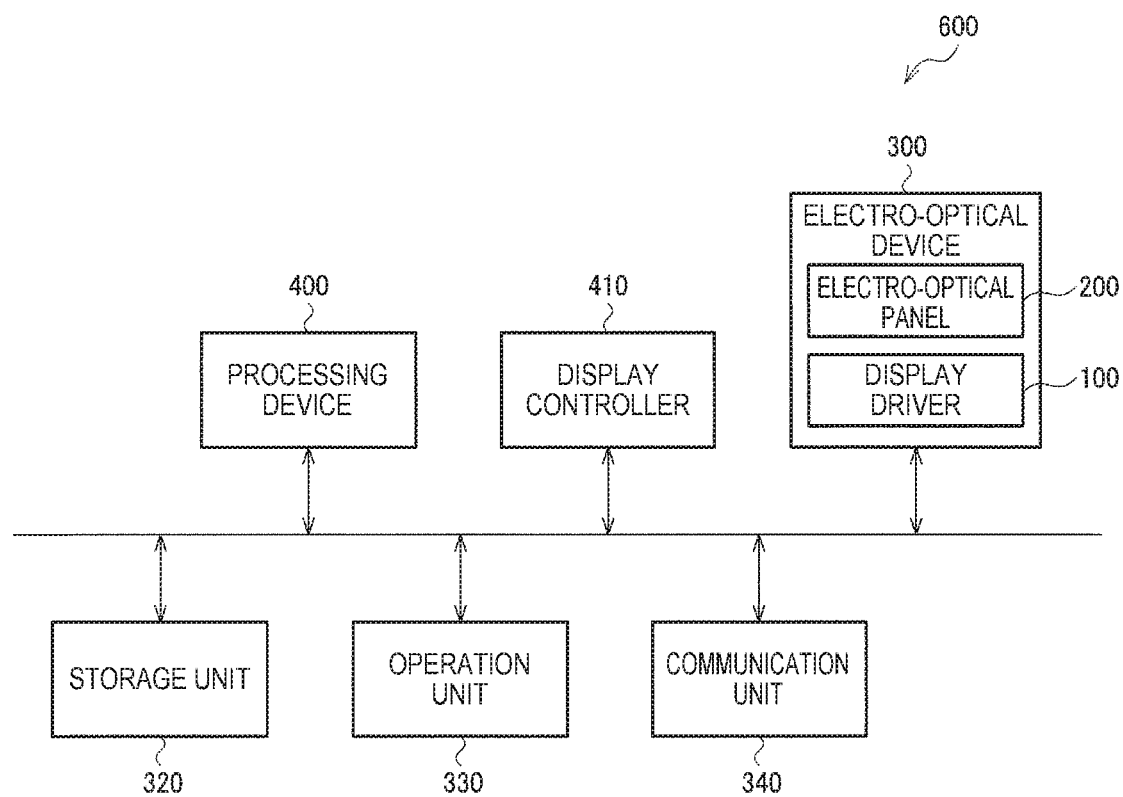
FIG. 13 shows an exemplary configuration of an electronic apparatus.

FIG. 13 shows an exemplary configuration of an electronic apparatus 600 including the display driver 100 of the present embodiment. Various electronic apparatuses incorporating an electro-optical device can be envisioned as the electronic apparatus of the present embodiment. For example, an in-vehicle device, a display, a projector, a television device, an information processing device, a mobile information terminal, a car navigation system, a mobile game terminal, a DLP (Digital Light Processing) device, or the like can be envisioned as the electronic apparatus of the present embodiment. The in-vehicle device is an in-vehicle display device such as a cluster panel, for example. The cluster panel is provided in front of a driver's seat, and is a display panel that displays a meter and the like.

The electronic apparatus 600 includes a processing device 400, a display controller 410, an electro-optical device 300, a storage unit 320, an operation unit 330, and a communication unit 340. The electro-optical device 300 includes the display driver 100 and the electro-optical panel 200.

The operation unit 330 is a user interface for receiving various operations made by a user. The operation unit 330 is constituted by a button, a mouse, a keyboard, and a touch panel, for example. The communication unit 340 is a data interface for performing communication of display data and control data. The communication unit 340 is a wired communication interface such as a USB or a wireless communication interface such as a wireless LAN, for example. The storage unit 320 stores image data input from the communication unit 340. Alternatively, the storage unit 320 functions as a working memory of the processing device 400. The storage unit 320 is a semiconductor memory, a hard disk drive, an optical drive, or the like. The processing device 400 performs processing to control the units of the electronic apparatus, and various types of data processing. The processing device 400 transfers display data received by the communication unit 340 or display data stored in the storage unit 320 to the display controller 410. The processing device 400 is a processor such as a CPU. The display controller 410 converts the format of the received display data to a format that the electro-optical device 300 can accept, and outputs the converted display data to the display driver 100. The display driver 100 drives the electro-optical panel 200 based on the display data transferred from the display controller 410.

Figure 14:
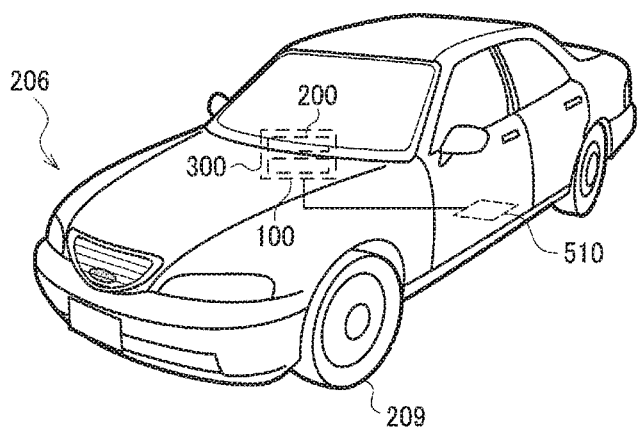
FIG. 14 shows an example of a mobile body.

FIG. 14 shows an exemplary configuration of a mobile body including the display driver 100 of the present embodiment. The mobile body is an apparatus or device that includes a drive mechanism such as an engine or a motor, steering mechanisms such as a steering wheel or a rudder, and various electronic apparatus, for example, and moves on the ground, in the air, and on the sea. Various types of mobile bodies such as a car, an airplane, a motorcycle, a ship, a mobile robot, and a walking robot can be envisioned as the mobile body of the present embodiment, for example.

FIG. 14 schematically illustrates an automobile 206 serving as a specific example of the mobile body. The electro-optical device 300 and a control device 510 that controls the units of the automobile 206 are incorporated in the automobile 206. The electro-optical device 300 includes the display driver 100 and the electro-optical panel 200. The control device 510 creates display image for displaying pieces of information such as speed, remaining fuel amount, travel distance, and settings of various types of devices to a user, and transmits the display data to the display driver 100. The display driver 100 drives the electro-optical panel 200 based on the display data. With this, information is displayed in the electro-optical panel 200.

The display driver described above includes a first drive terminal, a second drive terminal, and a drive circuit. The first drive terminal can be connected to a first segment electrode provided in an electro-optical panel that is driven by a static drive method. The second drive terminal can be connected to a second segment electrode that is provided in the electro-optical panel and whose area is larger than the area of the first segment electrode. The drive circuit outputs a PWM first segment drive signal to the first drive terminal, and outputs a PWM second segment drive signal to the second drive terminal. When the same effective voltage is applied to the first segment electrode and the second segment electrode, a first duty ratio, which is a duty ratio of the first segment drive signal is smaller than a second duty ratio, which is a duty ratio of the second segment drive signal.

According to the present embodiment, a segment drive signal having a relatively small duty ratio is applied to the first segment electrode in which the capacitive load of the segment electrode is small. With this, the same effective voltage is applied to the first segment electrode and second segment electrode whose capacitive loads are different, and therefore two cells whose areas are different can have the same transmittance.

Also, in the present embodiment, the second duty ratio when a maximum effective voltage is applied to the second segment electrode may be 100%. The first duty ratio when the maximum effective voltage is applied to the first segment electrode may be less than 100%.

According to the present embodiment, as a result of setting the duty ratio to be 100% when the maximum effective voltage is applied to the second segment electrode whose capacitive load is relatively large, the maximum effective voltage can be applied to both the first segment electrode and second segment electrode.

Also, in the present embodiment, the first duty ratio when the maximum effective voltage is applied to the first segment electrode may be 90% or less.

When the first duty ratio when the maximum effective voltage is applied to the first segment electrode is close to 100%, there is a risk that, even if the second duty ratio is set to 100%, the maximum effective voltage cannot be applied to the second segment electrode. According to the present embodiment, as a result of the first duty ratio being less than 90%, the maximum effective voltage can be applied to the second segment electrode.

Also, in the present embodiment, the display driver may include a power supply circuit that supplies a power supply voltage to the drive circuit. The drive circuit may output the first segment drive signal and the second segment drive signal that have the same voltage amplitude based on the power supply voltage.

According to the present embodiment, the same effective voltage can be applied by making the voltage amplitudes of the first segment drive signal and second segment drive signal to be the same and setting the first duty ratio and the second duty ratio. With this, because one power supply voltage need only be supplied to the drive circuit, the power supply circuit can be simplified.

Also, in the present embodiment, the drive circuit may include a first drive unit and a second drive unit. The first drive unit may output, based on tone data designating one of a plurality of display tones, the first segment drive signal having the first duty ratio corresponding to the tone data. The second drive unit may output the second segment drive signal whose second duty ratio is fixed based on fixed tone data indicating a predetermined one tone.

According to the present embodiment, tone display can be performed in a cell having the first segment electrode whose area is small, and binary control between ON and OFF can be performed on a cell having the second segment electrode whose area is large. Note that, there is no limitation thereto, and the second drive unit may also output, based on tone data, the second segment drive signal having the second duty ratio corresponding to the tone data.

Also, in the present embodiment, the display driver may include an interface circuit and a selection circuit. The interface circuit may receive instruction information from the outside. The selection circuit may select n pieces of duty ratio data (n is an integer smaller than k) from k pieces of duty ratio data based on the instruction information. The drive circuit may select output duty ratio data corresponding to the tone data from the n pieces of selected duty ratio data, and output the first segment drive signal having the duty ratio indicated by the selected output duty ratio data.

If only n duty ratios for n tones can be set, the first duty ratio that is smaller than the second duty ratio can be set to one of duty ratios whose number is less than n. According to the present embodiment, as a result of using the k pieces of duty ratio data that is larger than the n pieces of duty ratio data, the first duty ratio can be set to one of n duty ratios. Also, any n pieces of duty ratio data can be selected from the k pieces of duty ratio data, and therefore the duty ratios for PWM driving suitable for the VT characteristic of any liquid crystal can be set. That is, the display driver can be combined with various liquid crystal panels without re-designing the display driver.

Also, in the present embodiment, the area of the second segment electrode may be ten times or more the area of the first segment electrode.

As the area of the segment electrode increases, the capacitive load seen from the display driver increases, and therefore the effective voltage applied to the segment electrode decreases. In the present embodiment, the PWM duty ratio is increased for the segment electrode having a large capacitive load, and the effective voltage can be suppressed from decreasing.

Also, in the present embodiment, the first segment electrode may be a segment electrode of a first icon. The second segment electrode may be a segment electrode of a second icon.

According to the present embodiment, when the tone values are the same, the transmittance of liquid crystal can be the same between the first icon and the second icon. With this, the contrast can be the same between the first icon and the second icon whose areas are different.

Also, in the present embodiment, the first segment electrode may also be a segment electrode of an icon. The second segment electrode may also be a segment electrode of a liquid crystal shutter.

According to the present embodiment, the maximum effective voltage can be applied to a liquid crystal shutter whose capacitive load is large. With this, the liquid crystal shutter can be reliably controlled to be transmissive or non-transmissive. Also, according to the present embodiment, an overvoltage can be suppressed from being applied to an icon whose capacitive load is small.

Also, the electro-optical device of the present embodiment includes the display driver described above, a first electro-optical panel, which is the electro-optical panel described above, and a second electro-optical panel. The second electro-optical panel is a matrix-type electro-optical panel that is arranged so as to overlap the first electro-optical panel in a plan view of the first electro-optical panel. The first electro-optical panel is provided on a viewing side of an image displayed in the second electro-optical panel. The segment electrode of the liquid crystal shutter overlaps the second electro-optical panel in the plan view.

In this way, as a result of the display driver driving the liquid crystal shutter, the transmittance of the liquid crystal shutter can be controlled. For example, the display driver can switch between the state in which the image displayed in the second electro-optical panel can be viewed through the liquid crystal shutter and the state in which the image displayed in the second electro-optical panel is blocked by the liquid crystal shutter.

Also, the electro-optical device of the present embodiment may include any of the display drivers described above and the electro-optical panel.

Also, the electronic apparatus of the present embodiment includes any of the display drivers described above.

Also, the mobile body of the present embodiment includes any of the display drivers described above.

Note that although an embodiment has been described in detail above, a person skilled in the art will readily appreciate that it is possible to implement numerous variations and modifications that do not depart substantially from the novel aspects and effect of the disclosure. Accordingly, all such variations and modifications are also to be included within the scope of the disclosure. For example, terms that are used within the description or drawings at least once together with broader terms or alternative synonymous terms can be replaced by those other terms at other locations as well within the description or drawings. Also, all combinations of the embodiment and variations are also encompassed in the range of the disclosure. Moreover, the configuration and operation of the display driver, the electro-optical panel, the electronic apparatus, the mobile body, and the like are not limited to those described in the present embodiment, and various modifications are possible.

What is claimed is:

1. A display driver comprising:
a first drive terminal that can be connected to a first segment electrode provided in an electro-optical panel that is driven by a static drive method;
a second drive terminal that can be connected to a second segment electrode that is provided in the electro-optical panel and whose area is larger than the area of the first segment electrode; and
a drive circuit configured to output a PWM first segment drive signal to the first drive terminal, and output a PWM second segment drive signal to the second drive terminal,
wherein, when the same effective voltage is applied to the first segment electrode and the second segment electrode, a first duty ratio, which is a duty ratio of the first segment drive signal is smaller than a second duty ratio, which is a duty ratio of the second segment drive signal.

2. The display driver according to claim 1,
wherein the second duty ratio when a maximum effective voltage is applied to the second segment electrode is 100%, and
the first duty ratio when the maximum effective voltage is applied to the first segment electrode is less than 100%.

3. The display driver according to claim 2, wherein the first duty ratio when the maximum effective voltage is applied to the first segment electrode is 90% or less.

4. The display driver according to claim 1, further comprising a power supply circuit that supplies a power supply voltage to the drive circuit, wherein the drive circuit is configured to output the first segment drive signal and the second segment drive signal that have the same voltage amplitude based on the power supply voltage.

5. The display driver according to claim 1,
wherein the drive circuit includes:
a first drive unit configured to output, based on tone data designating one of a plurality of display tones, the first segment drive signal having the first duty ratio corresponding to the tone data, and
a second drive unit configure to output the second segment drive signal whose second duty ratio is fixed, based on fixed tone data indicating a predetermined one tone.

6. The display driver according to claim 5, further comprising:
an interface circuit configured to receive instruction information from outside, and
a selection circuit configured to select n pieces of duty ratio data (n is an integer smaller than k) from k pieces of duty ratio data based on the instruction information,
wherein the drive circuit selects output duty ratio data corresponding to the tone data from the n pieces of selected duty ratio data, and outputs the first segment drive signal having the duty ratio indicated by the selected output duty ratio data.

7. The display driver according to claim 1, wherein the area of the second segment electrode is ten times or more the area of the first segment electrode.

8. The display driver according to claim 1,
wherein the first segment electrode is a segment electrode of a first icon, and
the second segment electrode is a segment electrode of a second icon.

9. The display driver according to claim 1,
wherein the first segment electrode is a segment electrode of an icon, and
the second segment electrode is a segment electrode of a liquid crystal shutter.

10. An electro-optical device comprising:
the display driver according to claim 9;
a first electro-optical panel, which is the electro-optical panel; and
a matrix-type second electro-optical panel that is arranged so as to overlap the first electro-optical panel in a plan view of the first electro-optical panel,
wherein the first electro-optical panel is provided at a viewing side of an image displayed in the second electro-optical panel, and
the segment electrode of the liquid crystal shutter overlaps the second electro-optical panel in the plan view.

11. An electro-optical device comprising:
the display driver according to claim 1; and
the electro-optical panel.

12. An electronic apparatus comprising the display driver according to claim 1.

13. A mobile body comprising the display driver according to claim 1.

* * * * *